(12) United States Patent
Grayson (10) Patent No.: US 8,726,293 B2
(45) Date of Patent: May 13, 2014

(54) DYNAMIC APPLICATION POLICY FOR SERVICE BASED INTERACTION

(75) Inventor: Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 1217 days.

(21) Appl. No.: 11/657,851

(22) Filed: Jan. 25, 2007

(65) Prior Publication Data

US 2008/0184260 A1 Jul. 31, 2008

(51) Int. Cl.
*G06F 3/00* (2006.01)
*G06F 15/173* (2006.01)
*G06F 15/177* (2006.01)
*G06F 15/16* (2006.01)

(52) U.S. Cl.
USPC ............ 719/313; 709/224; 709/220; 709/206

(58) Field of Classification Search
None
See application file for complete search history.

(56) References Cited

U.S. PATENT DOCUMENTS

| | | | |
|---|---|---|---|
| 7,035,923 B1 * | 4/2006 | Yoakum et al. ............... | 709/224 |
| 7,089,307 B2 * | 8/2006 | Zintel et al. .................. | 709/224 |
| 8,234,360 B2 * | 7/2012 | Su et al. ........................ | 719/313 |
| 2001/0025300 A1 * | 9/2001 | Miller et al. ................... | 709/206 |
| 2004/0114744 A1 * | 6/2004 | Trossen ................... | 379/201.01 |
| 2004/0125756 A1 * | 7/2004 | Lepore et al. .................. | 370/261 |
| 2005/0283477 A1 * | 12/2005 | Donovan et al. .................. | 707/8 |
| 2006/0101098 A1 * | 5/2006 | Morgan et al. ................ | 707/204 |
| 2006/0230117 A1 * | 10/2006 | Gross et al. .................... | 709/207 |
| 2007/0274467 A1 * | 11/2007 | Pearson ........................ | 379/67.1 |
| 2012/0042015 A1 * | 2/2012 | Crawford et al. ............. | 709/206 |

OTHER PUBLICATIONS

"Technical Report, 3rd Generation Partnership Project; Technical Specification Group Services and System Aspects; Voice Call Continuity between CS and IMS Study", (Release 7), 9 pages, 2005, 3GPP TR 23.806 V7.0.0 (Dec. 2005) ,3GPP Organizational.

* cited by examiner

*Primary Examiner* — Tuan Dao
(74) *Attorney, Agent, or Firm* — Patent Capital Group (57) ABSTRACT

In one embodiment, dynamic state for an end device is stored. The dynamic state may be derived from a state of the end device or may be derived from other sources, such as third-party applications. A message is received and associated with a first application for the end device. Dynamic state for the end device is determined. The dynamic state may be applied to dynamic rules to determine an action to perform. For example, the interaction between the first application and the second application may be affected based on applying the dynamic state to the dynamic rules. Thus, the message may be routed differently based on the dynamic state.

13 Claims, 8 Drawing Sheets

DYNAMIC APPLICATION POLICY FOR SERVICE BASED INTERACTION

TECHNICAL FIELD

Particular embodiments generally relate to networking.

BACKGROUND

An IP multimedia subsystem (IMS) is a service delivery platform that allows service providers to deploy a single infrastructure to provide mobile and fixed multimedia services. It is a standardized next generation networking (NGN) architecture that may provide user authentication and authorization, identity management, roaming, and security and charging that can be leveraged by all session initiation protocol (SIP)-based applications. IMS is based on the concept of static rules that determine how a centralized SIP proxy will route incoming requests. For example, the request may be routed based on the registration status of a user, a matching feature tag within a SIP request or other information transported within a SIP message.

The SIP proxy model is predicated on the application of the static rules. Thus, once a static rule is set, when information that matches the static rule is determined, then the SIP message is routed based on that static rule. It is specified that messages are routed the same regardless of any changes of state that occur with the IMS. This does not provide flexibility in routing messages.

DESCRIPTION OF EXAMPLE EMBODIMENTS

Overview

In one embodiment, dynamic state for an end device is stored. The dynamic state may be derived from a state of the end device or may be derived from other sources, such as third-party applications. A message is received and associated with a first application for the end device. Dynamic state for the end device is determined. The dynamic state may be applied to dynamic rules to determine an action to perform. For example, the interaction between the first application and the second application may be affected based on applying the dynamic state to the dynamic rules. Thus, the message may be routed differently based on the dynamic state.

Example Embodiments

Figure 1:
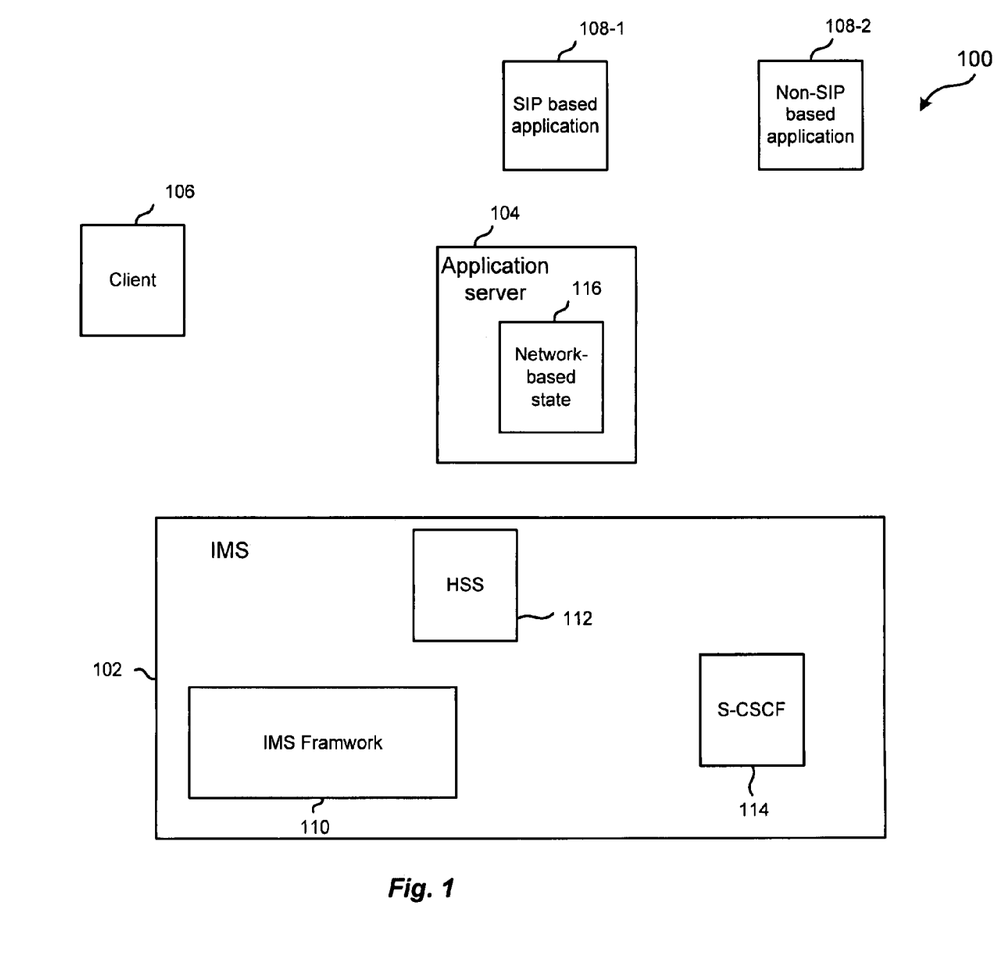
FIG. 1 shows an example of a system for applying dynamic state.

FIG. 1 shows an example of a system 100 for applying dynamic state. As shown, an IMS 102, application server 104, client 106, SIP-based application 108-1 and non-SIP-based application 108-2 are provided. IMS 102 may include any components of an IP multimedia subsystem. Although IMS framework 110, home subscriber server (HSS) 112, and serving-call session control function (S-CSCF) 114 are shown as being included in IMS 102, it will be understood by a person skilled in the art that any number of other components in an IMS may be provided, such as a P-CSCF, I-CSCF, etc. Also, although application server 104 is shown as being separate from IMS 102, it will be recognized it may be included in IMS 102, or any or part of its functions may be included in IMS 102.

Client 106 may be any device, such as an end device used by a user. For example, client 106 may be a cellular telephone, VoIP end point, server, laptop computer, personal digital assistant (PDA), etc.

Home subscriber server 112 may be a master user database that supports IMS network entities that are handling calls/sessions. It may include subscription-related information, such as user profiles, and performs authentication and authorization of a user. Further, home subscriber server 112 may provide information about the physical location of a user.

S-CSCF 114 is a central node in the signaling plane. In one embodiment, it is a SIP server but can also perform session control. S-CSCF 114 may communicate with home subscriber server 112 to download and upload user profiles. In one embodiment, S-CSCF handles SIP registrations, which allows it to confirm the user location (e.g. the IP address of client 106) and find one or more SIP addresses associated with the subscription of client 106. S-CSCF 114 sits in the path of all signaling messages and can inspect every message. It can then decide which application servers 104 the SIP message should be forwarded to for providing services. Also, S-CSCF 114 may enforce static rules for routing SIP messages. These static rules are enforced based on state that does not change. For example, the static rules may route messages based on the registration status of a user, a matching feature tag within a SIP request, information in the session description protocol (SDP) of a message, etc. This information may not change during a session.

Application server 104 may host and execute services and interface with S-CSCF 114 using SIP. Application server 104 may be used by third-party providers to provide services to IMS 102. Examples of services include voicemail, email, on-line banking, location-based services, television services, etc.

Application server 104 may store network-based state 116. Network-based state 116 may be dynamically updated with one or more dynamic parameters. For example, network-based state 116 may include dynamic parameters determined from client 106. Also, other network-based state 116 may be determined from other sources, such as SIP-based application 108-1 and/or non-SIP-based application 108-2, or any other source. The state may change over time. For example, a user may start watching an Internet Protocol TV (IPTV) session on client 106. The state of client 106 may change from "idle" to "watching IPTV". This state may change many times as client 106 interacts with different applications 108. Further, the state may change without any interaction with applications 108, such as when a battery level of client 106 goes below a certain level.

SIP-based application 108-1 may be any application that communicates using SIP. Also, non-SIP based application 108-2 may be any application that communicates in a protocol not using SIP. In one embodiment, SIP-based application 108-1 communicates through IMS 102 but non-SIP-based application 108-2 may not communicate through IMS 102.

Particular embodiments use dynamic rules that are applied based on the dynamic state determined. Interactions between multiple applications may be affected based on the dynamic state that is applied to the dynamic rules. Accordingly, as dynamic state changes, interactions between applications may change. For example, when the state of a user changes when an IPTV session is started, different actions may be applied than if a user was not watching IPTV. In one example, the interaction with a voicemail application is changed based on the state of client 106 with an IPTV application. Incoming calls may be sent directly to voicemail without going to client 106 when a user is watching IPTV.

Dynamic state may be created in many ways. FIGS. 2A-2F show various methods of creating state. However, it will be recognized that other methods of creating state will also be appreciated.

Figure 2A:
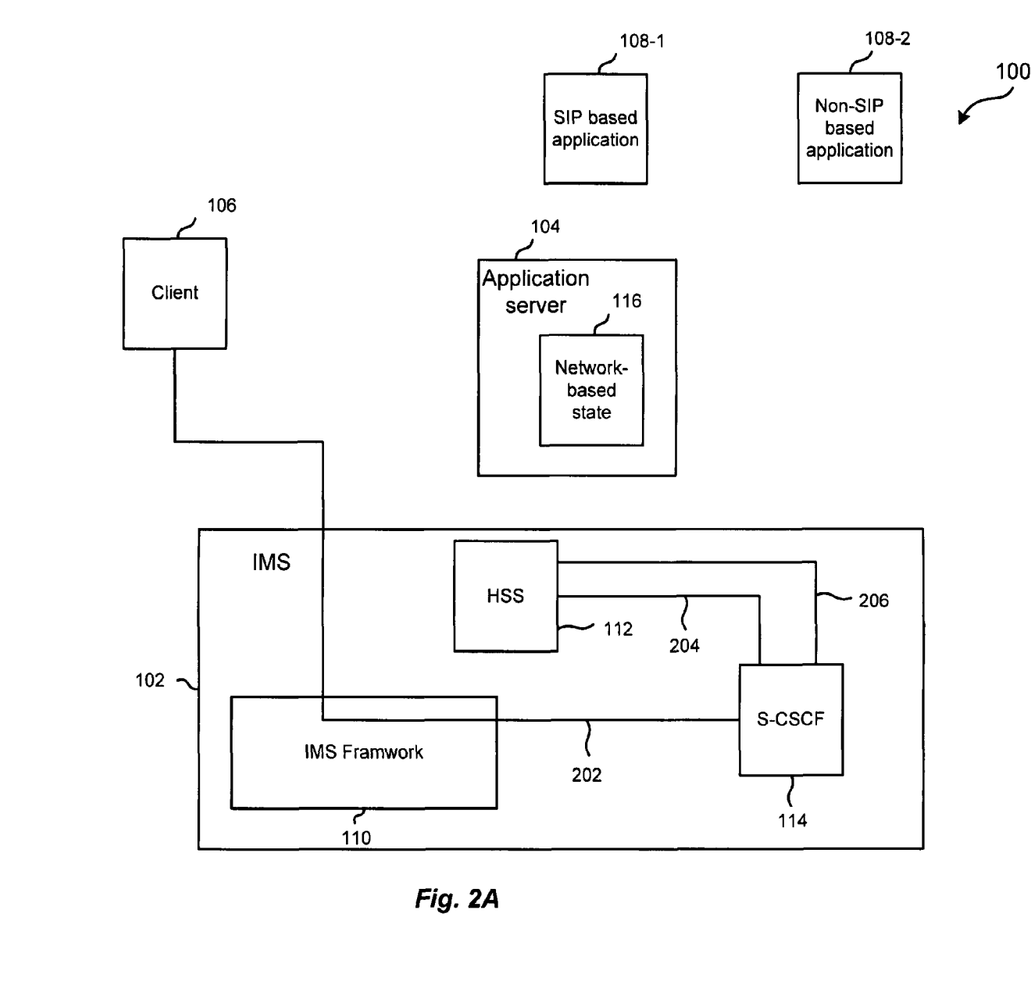
FIG. 2A shows an example of one way of creating state at an S-CSCF.

FIG. 2A shows an example of one way of creating state at S-CSCF 114. Client 106 may register with IMS 102. For example, at 202, client 106 registers through IMS framework 110 to S-CSCF 114.

S-CSCF 114 may contact home subscriber server 112 at 204 to authenticate client 106. Any authentication method may be used.

At 206, S-CSCF 114 may download a user profile for client 106. The user profile may include subscriber SIP-based policy routing rules. These may be static rules that are used to route SIP messages for client 106.

Figure 2B:
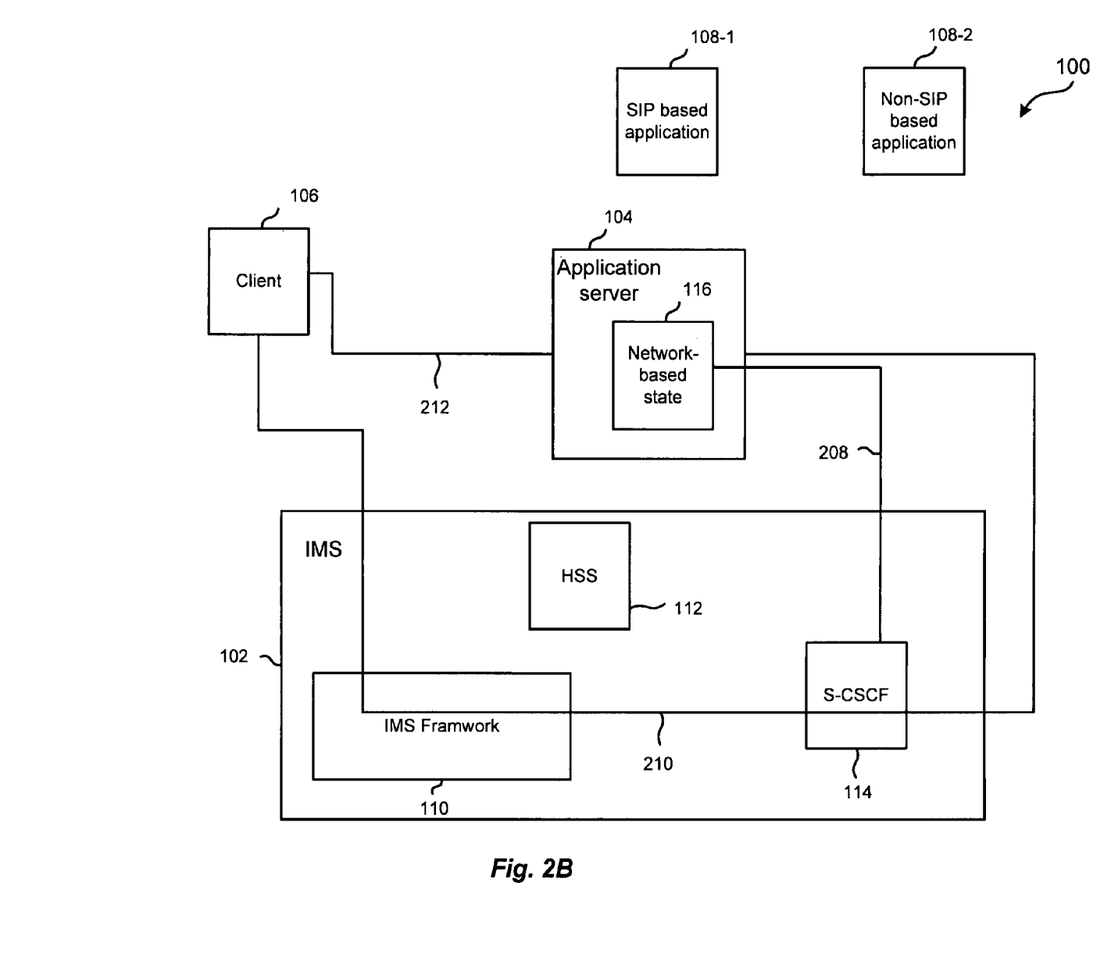
FIG. 2B shows a method of creating state at an application server.

FIG. 2B shows a method of creating state at application server 104. At 208, a policy in the policy routing rules downloaded from home subscriber server 112 causes S-CSCF 114 to register with application server 104. For example, S-CSCF 114 may perform a third-party register to network-based state 116.

At 210, application server 104 may register with client 106 to receive dynamic updates of state. For example, a message may be sent to client 106 to register with a dynamic event state package. This dynamic event state package may enable updates of state from client 106. These may be sent through SIP messages, such as notify/subscribe messages from client 106 to application server 104 through S-CSCF 114. Thus, automatic updates of client state are provided to application server 104. When client 106 detects a change of state, it can send a message to application server 104 via S-CSCF 114. A rule in S-CSCF 114 then forwards the state change to application server 104.

At 212, application server 104 pulls the user profile from home subscriber server 112. This is stored in network-based state 116. The user profile may be used to associate dynamic state with client 106.

Figure 2C:
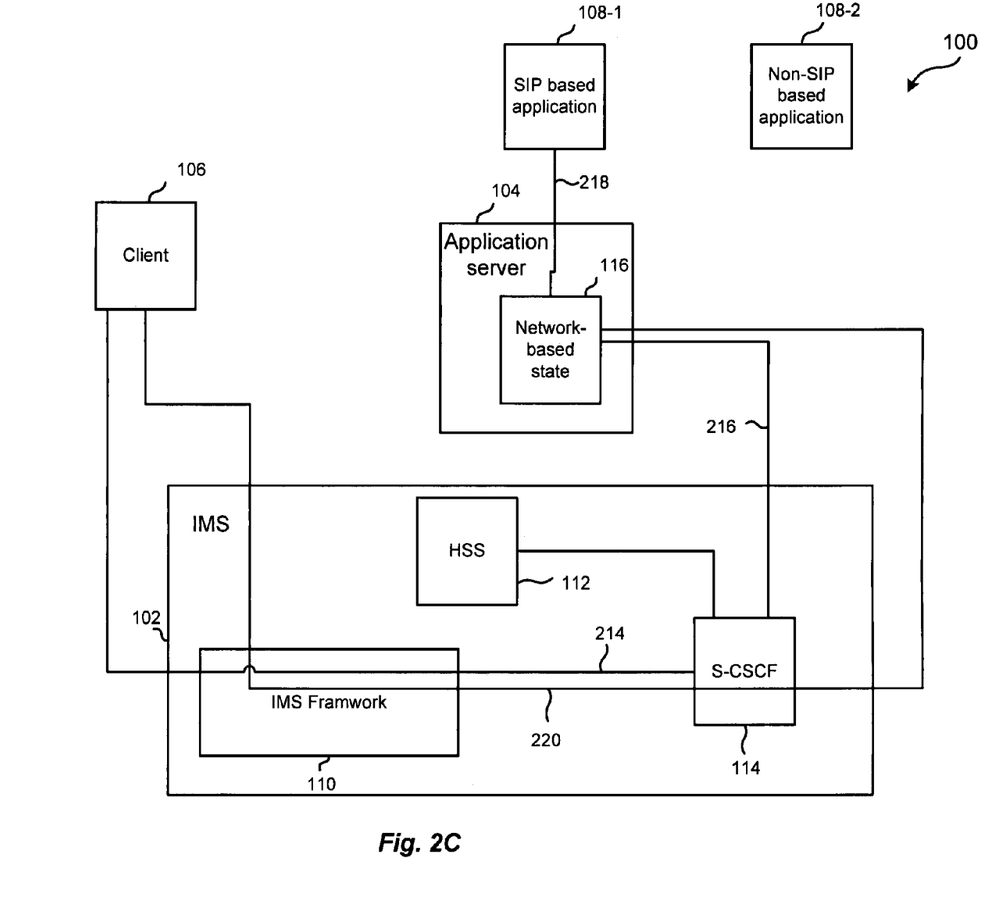
FIG. 2C shows an example of updating state for a client at the application server.

FIG. 2C shows an example of updating state for client 106 at application server 104. At 214, client 106 activates an IMS-based application. For example, a SIP message may be routed via S-CSCF 114 with a request to activate SIP-based application 108-1.

Static rules may then be matched to the request to determine how to route it. For example, the static rules may indicate that requests should be routed to application server 104. The static rules are used to route SIP messages that are received. The rules are applied the same no matter how the dynamic state in networked based state 116 changes. For example, the static rule may be to route registration requests from client 106 to application server 104.

At 216, S-CSCF 114 routes the SIP message to application server 104. Application server 104 then determines the current state with the user profile. Thus, application server 104 associates a state with client 106.

At 218, application server 104 routes the message to SIP-based application 108-1 based on the current state.

Figure 2D:
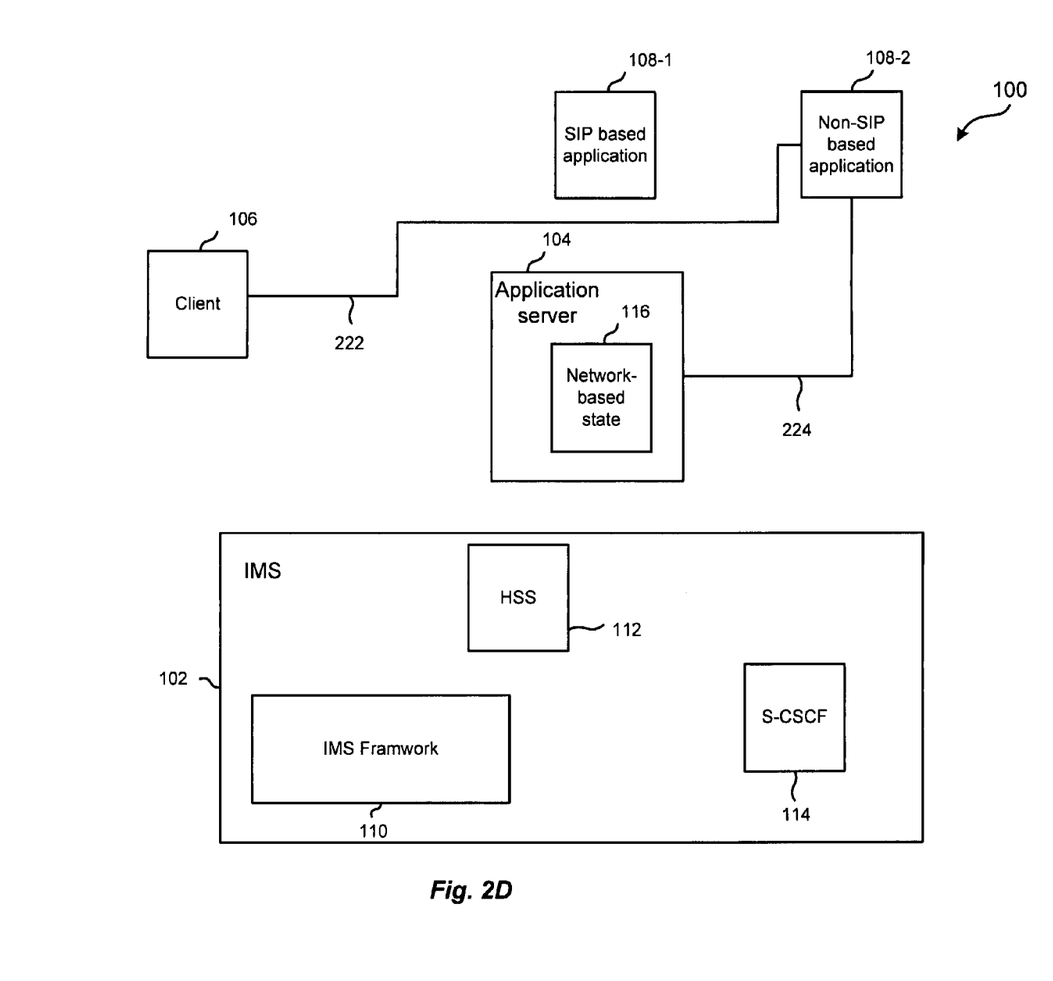
FIG. 2D depicts another method of updating state with non-SIP-based application.

At 220, client 106 indicates a state update to application server 104. The state update is stored in network-based state 116. This is a dynamic state that is received from client 106. Since application server 104 subscribes to client 106 to receive the state events package, when the state changes at client 106, a message is sent to application server 104; This message may be routed through IMS 102. For example, it is routed through IMS framework 110 via S-CSCF 114. S-CSCF 114 may match the message to static rules and route it to application server 104. Examples of the dynamic state that may be provided include:

i) geolocation and time zone, e.g., may be used by application server 104 to route messages for accessing local services ii) access network technology, e.g., may be used by application server 104 to trigger a change codec when access technology changes iii) time of day/week, e.g., may be used by application server 104 to implement intelligent call divert iv) presence/availability of participants, v) battery status, e.g., may be used by application server 104 to trigger a down-grade in service to ensure optimized minutes of use vi) remaining pre-paid balance, e.g., may be used by the application server 104 to trigger the lowering of video quality vii) unused handset memory, e.g., may be used by application server 104 to trigger the storing of different MIME types in preference to forwarding these to client 106 viii) roaming partner status, e.g., may be used by the application server 104 to lower data rates according to interoperator tariffing ix) accessory attachment, e.g., may be used by application server 104 to trigger the addition/deletion of media streams according to multi-media interface capability of client 106 x) Number of session participants, e.g., may be used by application server 104 to optimize a gaming experience xi) civic location type, e.g., may be used by the application server 104 to automatically divert calls to voicemail when receiving an incoming call and client 106 reports its location type as "place-of-worship"

xii) differential geolocation between participants, e.g., may be used by application server 104 to adapt a deliver service dependent upon differential spacing xiii) number of unread emails in my inbox, e.g., e.g., may be used by application server 104 to divert incoming calls if a threshold of unread emails has been exceeded FIG. 2D depicts another method of updating state with non-SIP-based application 108-2. At 222, client 106 interacts with non-SIP-based application 108-2. In this case, non-SIP-based application 108-2 is a non-IMS application. Accordingly, the message does not go through IMS 102. Thus, S-CSCF 114 may not receive any SIP messages and cannot forward them to application server 104. However, at 224, client 106 interacts with non-SIP-based application 108-2. Application server 108-2 then communicates the updated state of the client 106 to application server 104. Accordingly, even if the state changes because of interactions with non-IMS applications, the state is updated. For example, the state that is updated may indicate that client 106 is interacting with non-SIP-based application 108-2, such as client 106 is participating in a video on demand session.

Figure 2E:
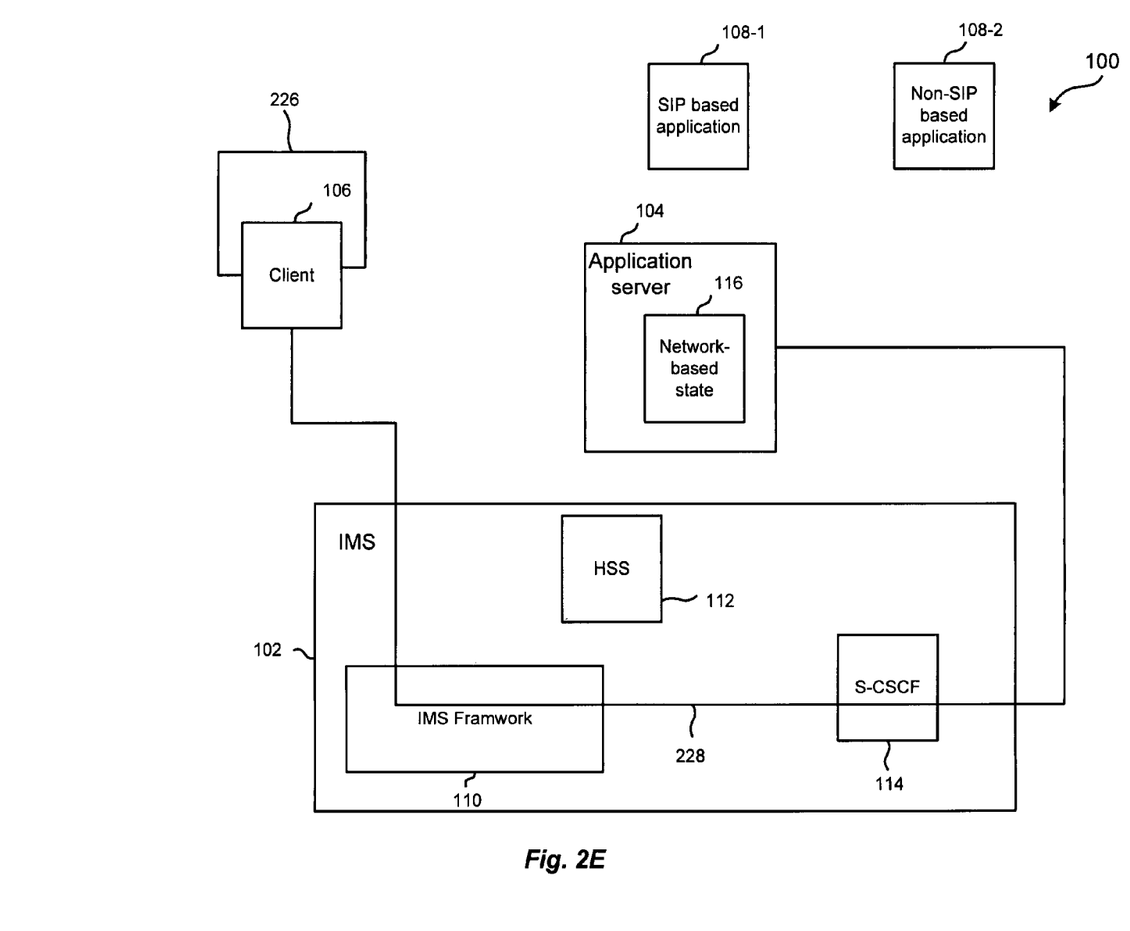
FIG. 2E depicts a method for updating state that is internal to the client.

FIG. 2E depicts a method for updating state that is internal to client 106. At 226, internal state inside client 106 may change. For example, a battery level may go below a certain threshold, the availability of client 106 may change, etc.

At 228, client 106 may update its state to application server 104. Application server 104 may then update network-based state 116. Accordingly, when client 106 detects state that may be changing, it sends the updates to application server 104.

Figure 2F:
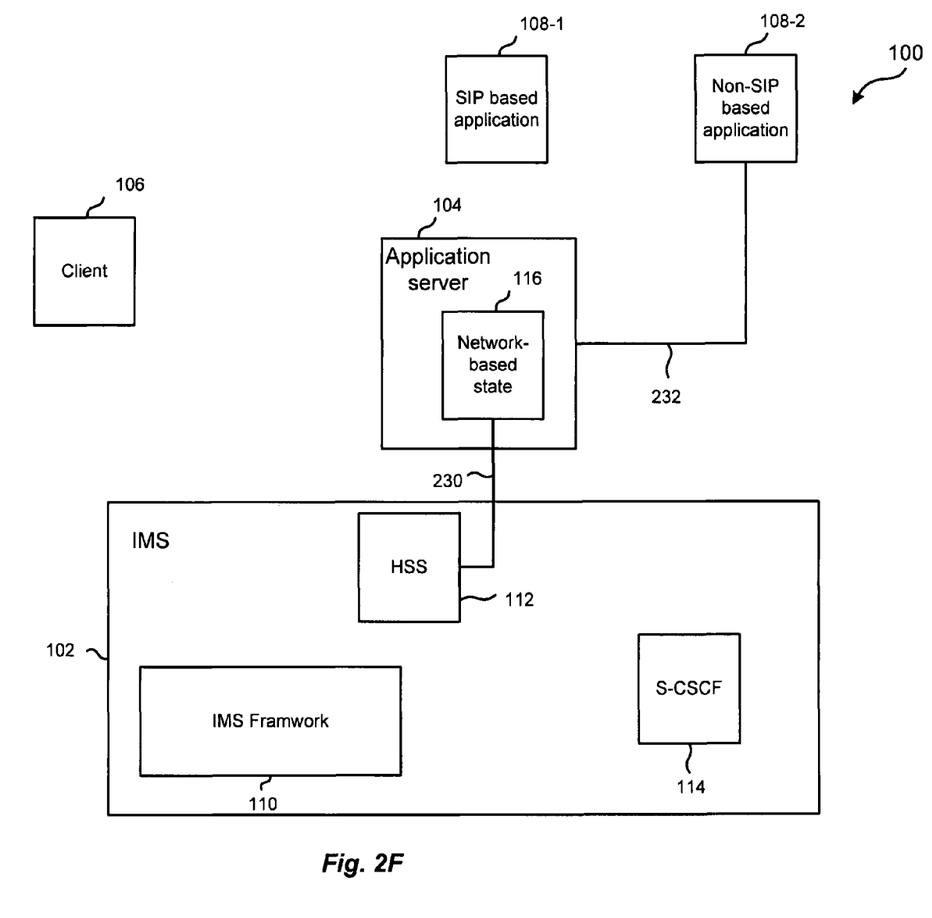
FIG. 2F shows an example of creating state using a source other than the client.

FIG. 2F shows an example of creating state using a source other than client 106. At 230, a third-party registration, such as from non-SIP-based application 108-2, may occur. After this, home subscriber server 112 may send information for the registration to application server 104, which is stored in network-based state 116. For example, the identifier for non-SIP application 108-2 for client 106 may be recovered from home subscriber server 112.

At 232, application server 104 then initiates a communication with the application identified to recover application state for client 106. Application server 104 may communicate with non-SIP-based application 108-2 to determine the application state on non-SIP-based application 108-2 for client 106. For example, a number of unread e-mails, available balance, or any other information related to client 106 may be determined. This information is stored as network-based state 116.

Figure 3:
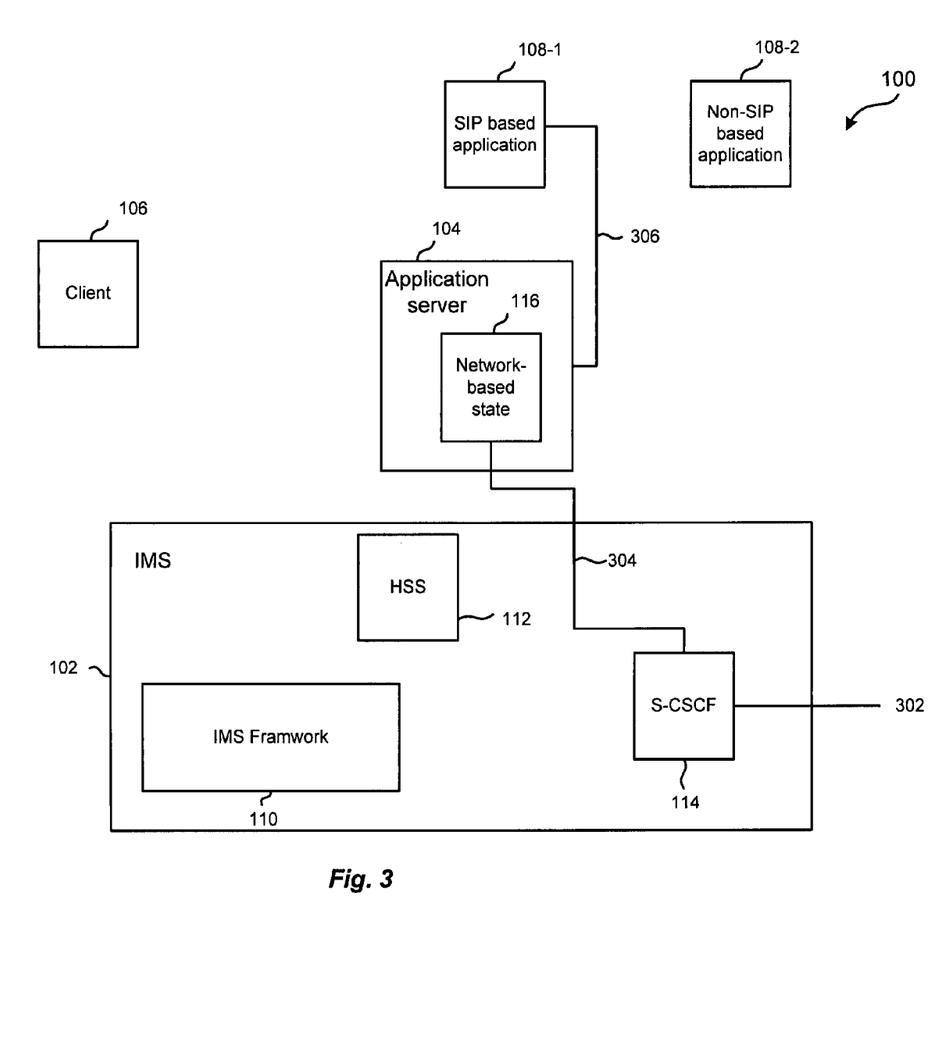
FIG. 3 shows an example of modifying behavior based on state.

Actions may be performed based on the dynamic state determined. FIG. 3 shows an example of modifying behavior based on state. At 302, an incoming SIP message is received at S-CSCF 114. For example, an incoming voice call may be received. In one example, SIP control messages may be received to initiate a voice call.

S-CSCF 114 then matches the SIP message to static rules. For example, static rules may state that incoming SIP messages should be routed to application server 104.

At 304, S-CSCF 114 routes the SIP message to application server 104. Application server 104 then applies the dynamic rules to the SIP message based on the dynamic state. For example, dynamic state in network-based state 116 may indicate that client 106 is engaged in an IPTV session. In this case, it is determined that client 106 is interacting with a second application that is different from the application that sent the SIP message. Thus, application server 104 determines an action to take based on the interactions between these two applications. For example, because client 106 is engaged in an IPTV session, client 106 may not want to receive the voice call. Accordingly, application server 104 may route the voice call (e.g., the SIP message) to a voicemail server.

At 306, application server 104 routes the SIP message to voicemail (SIP-based application 108-1). The routing of the message is determined based on the application of the dynamic rules based on dynamic state.

Accordingly, when multiple applications are being used by client 106, then the interactions between these applications are taken into account based on dynamic state of client 106. The dynamic state may be used to determine the actions to take. For example, if a user is watching IPTV using client 106 and is not in its home network, then the call may be routed to voicemail. This is an example of a dynamic rule that changes based on dynamic state. For example, if the user was in its home network, then the user may want to answer the voice call. This is different from a static rule which may state that voice calls are always diverted to voicemail when client 106 is being used to watch IPTV. The dynamic state is now taken into account and the application of dynamic rules may change based on dynamic state.

In another example, state from application 108 may be integrated with a calendar application, which provides state for a user. This is used to indicate that a user is in a meeting. Calls are then diverted to an assistant when dynamic rules are applied based on this state.

In yet another example, state may indicate which kind of network a user is connected to, such as a WCDMA network. Application server 104 can be used to integrate with an access gateway that is responsible for providing real time access technology information only when state indicates the user is on WCDMA network, and a SIP invite is sent to a user. Alternatively the invite is sent to CS interworking unit to deliver the call over legacy GSM network. This shows the interaction between an access gateway and interworking unit in which different changes in state affect how SIP messages are routed.

Although the description has been described with respect to particular embodiments thereof, these particular embodiments are merely illustrative, and not restrictive. For example, systems other than an IMS may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method to be performed in a network environment in which packets are exchanged, comprising:
   receiving a dynamic state update of network-based state associated with an end device, wherein the network-based state comprises at least one of:
     a relative location of the end device;
     a current date and/or time;
     a battery status of the end device;
     a number of participants in a session involving the end device;
     an accessory attached to the end device; and
     available memory of the end device;
   receiving user profile information associated with the end device, wherein the user profile information comprises static rules for applying to messages associated with the end device;
   associating the user profile information with the dynamic state update; and
   applying one or more rules to determine an action for a message associated with the end device based on the user profile information and the dynamic state update, wherein the action comprises forwarding the message to an application;
   wherein the static rules are applied to the message before the dynamic state update is applied to determine a static action;
   wherein the action includes changing an operation associated with a non-SIP application being concurrently used with a SIP application on the end device, wherein the non-SIP application is associated with a video session being conducted on the end device; and
   wherein the dynamic state update comprises information received from a device or application other than the end device.

2. The method of claim 1, wherein the action determined by applying the dynamic state update is performed in addition to or instead of the static action determined.

3. The method of claim 1, wherein the message comprises a control message for setting up a connection between the end device and an application.

4. The method of claim 1, wherein different actions are determined based on different dynamic states that result.

5. The method of claim 1, wherein the dynamic state update is received from an Internet protocol (IP) multimedia subsystem (IMS) application.

6. The method of claim 1, further comprising registering with the end device to receive updates of dynamic state associated with the end device.

7. Logic encoded in non-transitory media for execution by a processor, and when executed is operable to:
   receive a dynamic state update of network-based state associated with an end device;
   receive user profile information associated with the end device, wherein the user profile information comprises static rules for application to messages associated with the end device and wherein the network-based state comprises at least one of:
- a relative location of the end device;
- a current date and/or time;
- a battery status of the end device;
- a number of participants in a session involving the end device;
- an accessory attached to the end device; and
- available memory of the end device;

associate the user profile information with the dynamic state update; and apply one or more rules to determine an action for a message associated with the end device based on the user profile information and the dynamic state update, wherein the action comprises forwarding the message to an application;

wherein the static rules are applied to the message before the dynamic state update is applied to determine a static action;

wherein the action includes changing an operation associated with a non-SIP application being concurrently used with a SIP application on the end device, wherein the non-SIP application is associated with a video session being conducted on the end device; and wherein the dynamic state update comprises information received from a device or application other than the end device.

8. The logic of claim 7, wherein the action determined by applying the dynamic state update is performed in addition to or instead of the static action determined.

9. The logic of claim 7, wherein the message comprises a control message for setting up a connection between the end device and an application.

10. The logic of claim 7, wherein different actions are determined based on different dynamic states that result.

11. The logic of claim 7, wherein the dynamic state update is received from an Internet protocol (IP) multimedia subsystem (IMS) application.

12. The logic of claim 7, wherein the logic when executed is further operable to register with the end device to receive updates of dynamic state associated with the end device.

13. An apparatus, comprising:
control logic; and
one or more processors operable to execute instructions associated with the control logic such that the apparatus is configured for:
receiving a dynamic state update of network-based state associated with an end device;
receiving user profile information associated with the end device, wherein the user profile information comprises static rules for application to messages associated with the end device and wherein the network-based state comprises at least one of:
- a relative location of the end device;
- a current date and/or time;
- a battery status of the end device;
- a number of participants in a session involving the end device;
- an accessory attached to the end device; and
- available memory of the end device;

associating the user profile information with the network state update; and apply one or more rules to determine an action for a message associated with the end device based on the user profile information and the dynamic state update, wherein the action comprises forwarding the message to an application;

wherein the static rules are applied to the message before the dynamic state update is applied to determine a static action;

wherein the action includes changing an operation associated with a non-SIP application being concurrently used with a SIP application on the end device, wherein the non-SIP application is associated with a video session being conducted on the end device; and wherein the dynamic state update comprises information received from a device or application other than the end device.

\* \* \* \* \*